No. 730,651. PATENTED JUNE 9, 1903.
H. A. HOBSON.
BREWING.
APPLICATION FILED OCT. 1, 1901.
NO MODEL.
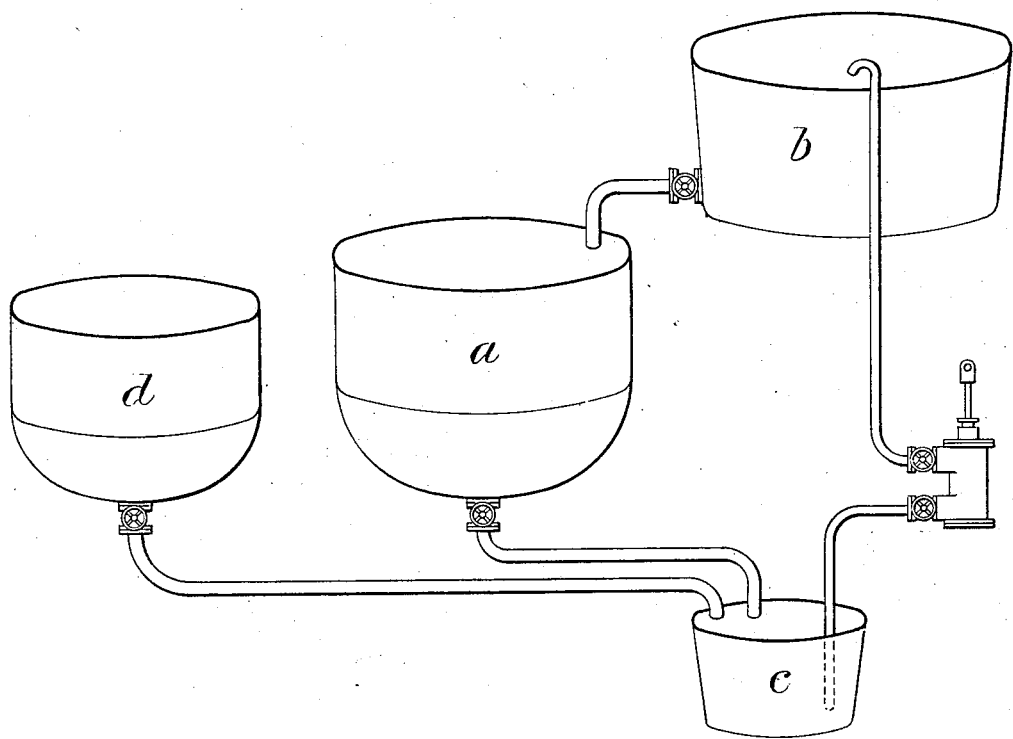
WITNESSES:
A. H. Davis
O. D. Rollhaus
INVENTOR
Herbert A. Hobson
BY
ATTORNEYS No. 730,651. Patented June 9, 1903.

UNITED STATES PATENT OFFICE.

HERBERT AMOS HOBSON, OF LONDON, ENGLAND, ASSIGNOR TO THE CONCENTRATED BEER COMPANY, LIMITED, OF ACTON, LONDON, ENGLAND.

BREWING.

SPECIFICATION forming part of Letters Patent No. 730,651, dated June 9, 1903.

Application filed October 1, 1901. Serial No. 77,191. (No specimens.)

*To all whom it may concern:*

Be it known that I, HERBERT AMOS HOBSON, analytical chemist, a subject of the King of Great Britain, residing at 54 Church road, Acton, London, England, have invented new and useful Improvements in Brewing, of which the following is a specification.

This invention relates to a method of brewing in which a hopped wort is produced by first making an infusion or decoction of hops, then running off the infusion or decoction, and after fixing the tannic acid extracted from the hops mashing malt (or malt and grain) in the hop infusion or decoction as the mashing liquor. The aforesaid process forms the subject of an application for Letters Patent bearing Serial No. 25,015 and filed July 27, 1900; and the especial object of the present invention is to effect an economy in working such process by extracting to the utmost possible extent the useful properties remaining in or retained by the materials treated and making them available in the production of the wort.

The invention consists, first, in a methodical process whereby the residual soluble matter contained in the spent malt and spent hops is extracted, the liquor containing such residual extractive matter being used instead of plain water for making the decoction of hops for a fresh brew, so that the residual malt and hop extract obtained from the spent malt and hops left from one brew will be utilized in the next succeeding brew, and so on.

The invention consists, secondly, in withdrawing from the hop extract (after it has been treated to fix the tannic acid, but before it is used for mashing) a portion of the hop liquor, separately heating the liquor thus withdrawn, and returning it to the bulk of the liquor after the mashing of the latter with malt, (or malt and grain,) so as to thereby raise the temperature of the mash without causing dilution thereof, as would be the case were naked steam blown in.

In order that the invention may be better understood, I will describe it with reference to the accompanying diagram, in which—

*a* indicates the copper or vessel in which the infusion or decoction of hops is made; *b*, the mash-tub; *c*, the hop-liquor "back," and *d* a supplementary vessel in which the spent hops are placed after the infusion or decoction has been strained off therefrom.

In first starting a series of brewing operations plain water might be used for making the initial hop extract; but I prefer for the sake of uniformity of results to perform the preliminary operation next described. Of one hundred parts of the malt intended to be used for the first brew five to ten parts are taken. To these five to ten parts of malt are added five times their weight of water, with which the said portion of the malt is mashed at about 150° Fahrenheit for about one hour, and then this malt liquor or extract is run into the copper *a* along with sufficient water to make up the total quantity of liquor necessary for the preparation of the desired amount of hop infusion or decoction.

It is to be understood that the malt liquor or extract especially prepared as above mentioned need only be prepared once (and that optionally)—namely, at the outset of, say, a week's (or an indefinitely numerous series of) brewing operations—and then only because no previous brew having been made no residual liquor from a previous brew is available. This preliminary operation, therefore, forms no essential part of the process proper of my invention, which I will now proceed to describe, as follows: The amount of hops which it is thought proper to employ in the brew (which hops may have previously been deprived by mechanical means of a certain proportion of the "condition" or "lupulin") is placed in the copper *a*, together with about one hundred to one hundred and fifty times its weight of liquor, (obtained at first starting by the preliminary operation above described or, in other cases, from a previous brew,) this liquor being then at a temperature of 150° to 160°. The temperature of the hops and liquor is then gradually raised to boiling-point, the time occupied in that operation being preferably about half an hour. The liquor and hops should then be boiled briskly for about two hours, according to the quality of the beer to be produced. The decoction or infusion is finally strained from the hops and run into the vessel *c*, while the spent hops are removed from the copper *a* and placed in the vessel $d$ for further treatment. Next the decoction of hops is transferred to the mash-tun $b$, and in this hop liquor there is digested for about half an hour a small quantity of ground malt—say about five per cent. of the amount which it is intended to use for the brew—or it may be an equivalent amount of spent grains or other albumen-containing substance, the object of this step being to fix the tannic acid extracted from the hops. This done, about one-fourth part of the hop liquor is run off from the mash-tun into a suitably-placed vessel, and in the remaining three-quarters of the hop liquor the balance of the total quantity of the ground malt which it is intended to use for the brew is mashed at the proper temperature—say 150° Fahrenheit—for half an hour, after which the fourth part of the hop liquor, which had been previously withdrawn, as just before described, and which has meanwhile been separately heated to, say, from 180° to 200°, is returned to the mash-tun $b$ and mixed with the mash, thus raising the mash to a higher temperature—say to from 150° to 160° Fahrenheit—without diluting the mash and prejudicing the diastatic power of the malt, as would be the case were naked steam blown into the mash when the latter is at this temperature. The mash is then digested for from a quarter to half an hour, one-quarter of the liquor having again been previously run off, and after being separately heated to boiling (or from 200° to 212° Fahrenheit) being again pumped upon and mixed with the mash, so as to still further raise its temperature to 170° to 180° Fahrenheit, or instead of withdrawing, separately heating, and returning a portion of the liquor a second time the liquor may be heated by a steam-coil or even by blowing in steam at a pressure of preferably not over thirty pounds, since at the higher temperature of this particular stage of the mashing less steam is condensed, and consequently the diastatic action is not so much weakened. After stirring sufficiently to properly distribute the heat throughout the mash the latter is allowed to stand for, say, from one to two hours in order to settle. The wort is then run off into the boiling-copper $a$ and boiled for half an hour or upward. The wort may then be filtered, if desired, and after cooling to the proper fermenting temperature is run into the fermenting vessel, where it is "pitched" with yeast and fermented in the usual manner. To the residual or spent hops in $d$ is added a quantity of water, (equal to about one-half that which was used in making the decoction of hops above mentioned,) and after being boiled for a few minutes the decoction thus made from the spent hops is run off and pumped onto the spent malt in the mash-tun $b$. After being allowed to stand for, say, one-quarter of an hour the liquor is drained off and run into the main boiler or copper $a$ for use (with the addition of the necessary quantity of sparging-liquor hereinafter mentioned, or of water, or of both) as the liquor in which to boil a fresh batch of hops in the copper $a$, as before. In this way the risk of introducing into the wort soluble or mechanically-suspended starch, which in the ordinary process of brewing would be incurred were the washings of the malt and hops mixed with the wort proper, is avoided. In order to obtain practically the whole of the malt and hop extract remaining absorbed by the spent malt in the mash-tun, the latter should then be sparged with hot water and the liquor thus obtained run off into the boiler or copper $a$ along with the other liquor coming from the spent hops, the quantity of water used for sparging being that necessary to make up, as above mentioned, the quantity of liquor required for a fresh batch of hops.

Having now particularly described and ascertained the nature of the said invention and in what manner the same is to be performed, I declare that what I claim is—

1. The improvement in the art of brewing, consisting, first, in preparing a liquor by extracting the residual soluble constituents retained by the spent hops and spent malt of a previous brew, second, in preparing a decoction of hops by digesting and boiling the hops in said liquor, and third, in mashing malt (or grain and malt) in said decoction.

2. The improvement in the art of brewing consisting, first, in preparing a liquor by boiling in water the spent hops of a previous brew and digesting the spent malt in the spent-hop extract, second, in preparing a decoction of hops by digesting and boiling the hops in said liquor, and third, in mashing malt (or grain and malt) in said decoction.

3. The improvement in the art of brewing consisting, first, in preparing a liquor by boiling in water the spent hops of a previous brew, digesting the spent malt of a previous brew in the spent-hop extract, drawing off the liquor, sparging the spent malt with hot water and adding the spargings to the spent-malt extract, so that the liquor will contain substantially the whole of the residual soluble constituents of the spent hops and spent malt, second, in preparing a decoction of hops in said liquor, and third, in mashing malt (or grain and malt) in said decoction.

4. The improvement in the art of brewing consisting, first, in withdrawing from the bulk a portion of the hop infusion after treatment to fix the tannic acid, second, in heating the liquor so withdrawn, and third, in returning it to the bulk, whereby to raise the temperature of the mash liquor without diluting it by the introduction of naked steam.

HERBERT AMOS HOBSON.

Witnesses:
FREDC. HARRIS,
W. J. NORWOOD.